(No Model.)

F. G. SUSEMIHL.
ANTIFRICTION JOURNAL BEARING.

No. 503,296. Patented Aug. 15, 1893.

Witnesses

Inventor
Francis G. Susemihl
By Thos. S. Sprague & Son
Attys.

UNITED STATES PATENT OFFICE.

FRANCIS G. SUSEMIHL, OF DETROIT, MICHIGAN, ASSIGNOR OF ONE-HALF TO AUGUSTUS TORREY, ADOLPH BARTHEL, AND JAMES WHITTEMORE, OF SAME PLACE.

ANTIFRICTION JOURNAL-BEARING.

SPECIFICATION forming part of Letters Patent No. 503,296, dated August 15, 1893.

Application filed April 24, 1893. Serial No. 471,593. (No model.)

*To all whom it may concern:*

Be it known that I, FRANCIS G. SUSEMIHL, a citizen of the United States, residing at Detroit, in the county of Wayne and State of Michigan, have invented certain new and useful Improvements in Antifriction Journal-Bearings, of which the following is a specification, reference being had therein to the accompanying drawings.

This invention relates to an improvement in that class of journal bearings in which rolling friction is alone produced by reason of the interposition of anti-friction rollers between the journal or axle and the stationary part of the bearing.

The object of my invention is to make a roller bearing in which all the peripheries of the different parts forming the bearing shall have true rolling contact with each other in a manner to form a simple and strong bearing.

To this end my invention consists in the peculiar and novel manner in which a series of cylindrical rollers interposed between the movable and stationary part of the bearing are kept apart by means of balls in a manner to have true rolling contact between the balls and rollers, all as more fully hereinafter described and shown in the annexed drawings in which—

Figure 1:
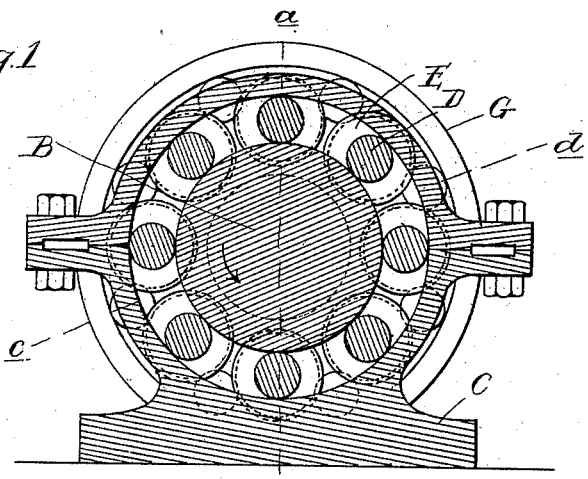
Figure 2:
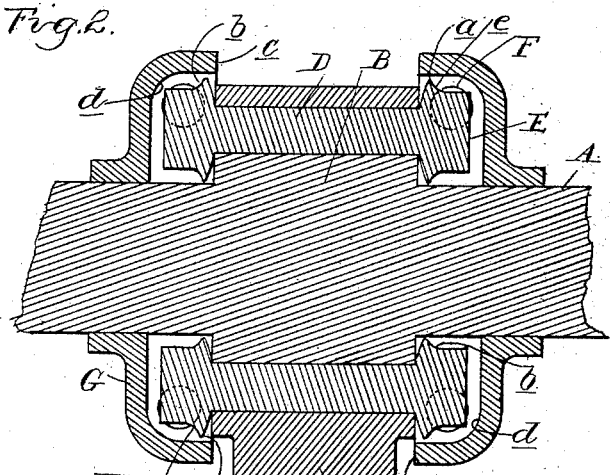
Figure 3:
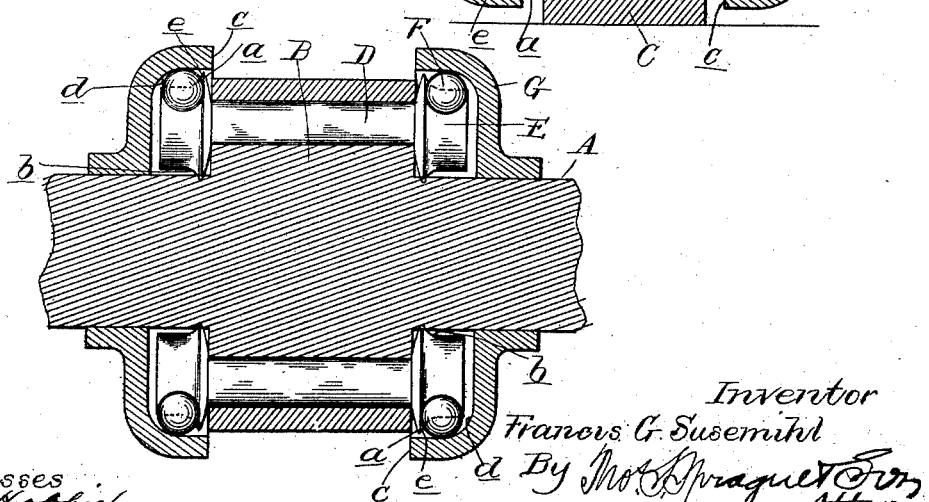

Figure 1 is a cross section of my improved bearing taken substantially in the center thereof. Figs. 2 and 3 are longitudinal sections thereof taken respectively in planes on the lines $a\ b$, $c\ d$ in Fig. 1.

A represents a shaft provided with a cylindrical enlargement B, which if desired, may be a sleeve of steel or other hard material shrunk or otherwise firmly fixed upon the shaft and this enlarged portion of the shaft forms the journal.

C represents a plummer block of the conventional form and construction but it may be any other of the various different forms of boxes or casings used for the bearings of axles or shafts, all that is material is that it shall form a cylindrical bearing corresponding to and concentric with the journal on the shaft and that it is constructed in two or more parts.

D represents cylindrical rollers interposed between the inner surface of the casing and the outer surface of the enlarged journal on the shaft.

E are enlarged cylindrical heads formed at the opposite ends of the rollers D and projecting laterally beyond the bearing and the journal. These heads have peripheral flanges $a$ and convex inner sides $b$ for the purpose more fully hereinafter described.

F are balls interposed between the heads E of the rollers to keep the same out of contact with each other.

G are caps secured to the shaft A on opposite sides of the bearing and these caps have flanges $c$ which incase the balls and the projecting heads of the rollers and form an interior ball race on which the balls are adapted to travel. The parts being constructed as shown and described, it will be seen that if relative motion takes place between the shaft and the casing the rollers being entirely held out of contact with each other by the balls, must travel with a true rolling motion in contact with the journal and bearing of the casing. In like manner no matter in which direction the motion takes place the balls will always be in rolling contact with the rollers and at the same time they are adapted to travel in rolling contact upon the flanges $c$ forming the ball race, provided the relative dimensions of all the parts (which is a matter of simple calculation) are such that the peripheral speeds of the contacting parts harmonize. Thus suppose the motion of the shaft is in the direction of the arrow shown in Fig. 1, it will be seen that the rollers must revolve at the same speed in a direction opposite thereto, while the balls being intermediate between must revolve at a speed equal to the speed of the heads in the same direction as the shaft and if this speed harmonizes with the speed of the flange $c$ on which the ball travels then perfect rolling contact between all the parts exists. It will be noticed that the rollers are prevented from end motion by the enlarged head, the friction being reduced by making them convex as shown. The ball race in the caps is also provided with a rounding corner $d$ and the flanges $a$ are correspondingly rounded at $e$ to prevent lateral motion of the balls with the least amount of friction.

What I claim as my invention is—

In a roller bearing, the combination of a shaft having an enlarged journal, a casing or box forming a concentric bearing thereto, rollers interposed between said journal and bearing the enlarged heads E on said rollers outside of the journal and bearing, and provided at their inner ends only with the peripheral concave flanges $a$ having convex inner sides $b$, the balls F interposed between the enlarged roller heads, and the cap G secured to the shaft and provided with concave flanges $c$ confining the balls in position against the outer faces of the enlarged roller heads and forming the ball race, substantially as described.

In testimony whereof I affix my signature in presence of two witnesses.

FRANCIS G. SUSEMIHL.

Witnesses:
M. B. O'DOGHERTY,
N. L. LINDOP.